United States Patent [19]
Parr
[11] Patent Number: 4,798,860
[45] Date of Patent: Jan. 17, 1989

[54] FLAME RESISTANT ORGANIC SUBSTANCES CONTAINING POLYMERIC FLAME RETARDANTS

[75] Inventor: William J. Parr, Naperville, Ill.
[73] Assignee: Akzo America Inc., New York, N.Y.

[21] Appl. No.: 88,166
[22] Filed: Aug. 21, 1987
[51] Int. Cl.[4] ........................ C08G 61/02; C08L 65/04
[52] U.S. Cl. .................................... 524/409; 524/471; 525/64; 525/185; 525/416
[58] Field of Search ................. 525/420, 437, 64, 185, 525/416; 524/471, 411, 412, 471, 409

[56] References Cited

U.S. PATENT DOCUMENTS

| | | | |
|---|---|---|---|
| 3,240,722 | 3/1966 | Orttung | 528/396 |
| 3,349,045 | 10/1967 | Gilch | 528/397 |
| 3,413,241 | 11/1968 | Le Suer | 525/188 |
| 3,418,267 | 12/1968 | Busse | 524/471 |
| 3,437,627 | 4/1969 | Gude | 524/471 |
| 3,668,169 | 6/1972 | Brinkman | 524/471 |
| 3,692,867 | 9/1972 | Mayer | 525/437 |
| 3,981,936 | 9/1976 | Petersen | 523/517 |

*Primary Examiner*—John C. Bleutge
*Assistant Examiner*—David Buttner
*Attorney, Agent, or Firm*—Jeffrey S. Boone

[57] ABSTRACT

A flame resistant organic substance comprising an organic substance having intimate contact therewith a flame retarding amount of a flame retardant compound of the formula:

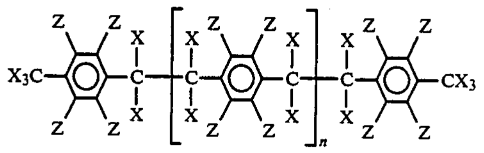

wherein each X is independently Cl, or Br, each Z is independently Cl, Br, or H and n is sufficiently high that the compound will be sufficiently nonvolatile that it is capable of retarding the tendency of the substance to flame.

13 Claims, No Drawings

FLAME RESISTANT ORGANIC SUBSTANCES CONTAINING POLYMERIC FLAME RETARDANTS

BACKGROUND OF THE INVENTION

This invention relates to flame retardant compounds which may be contacted with organic substances to reduce the tendency of the organic substance to flame.

For reasons of customer demand, government regulations, and product stewardship, those manufacturing and selling organic substances, particularly synthetic resins, have sought to reduce the tendency of those substances to flame. A suitable flame retardant additive must be economical to purchase, relatively nontoxic, easy to incorporate into the organic substance, nonmigrating, and effective at reducing the tendency of the substance to flame.

U.S. Pat. No. 3,349,045 (1967, Union Carbide (Gilch)) and U.S. Pat. No. 3,399,124 (1968, Union Carbide (Gilch)) teach the preparation of poly(α,α,α',α'-tetrachloro-p-xylene), also know as PTCPX, and its use in preparing films. V. W. Gash, The Reaction of Trichloromethyl Aromatic Compounds with Triethyl Phosphite, J. Org. Chem., V. 32, p. 2007 (1967 June), discusses several theories concerning the synthesis mechanism of PTCPX. None of these references teach the use of PTCPX as a flame retardant additive for other polymers.

SUMMARY OF THE INVENTION

In one respect the invention is a flame resistant organic substance comprising an organic substance having in intimate contact therewith a particular flame retardant compound.

In another respect the invention is a method of retarding the flammability of an organic substance by intimately contacting the organic substance with a particular flame retardant compound.

In yet another respect the invention is the flame resistant organic substance produced by the above method.

CAUTIONS

Although this invention concerns "flame retardants", it is important to understand that no compound can render an otherwise flammable composition flame proof. That is, all flammable compositions will under certain conditions burn exothermically despite the incorporation of flame retardants. It is also important to understand that the instant invention has been evaluated only in very small scale laboratory tests. It is not known if this invention is equally as effective under actual fire conditions. Any user of this technology must determine the suitability of its use for each particular application.

DETAILED DESCRIPTION OF THE INVENTION

The invention requires a flame retardant compound according to formula A:

[A]

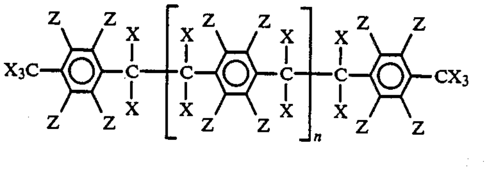

wherein each X is independently Cl or Br, preferably Cl; each Z is independently Cl, Br, or H, preferably H; and n is sufficiently high that the compound will be sufficiently nonvolatile that it is capable of retarding the tendency of an organic substance to flame. Generally, n will be 5–10,000 preferably 250–7500, and more preferably 500–5000. Because of the insolubility of the compounds of the invention, molecular weight determinations are very difficult. Therefore, values of n are only approximate. In a most preferred embodiment each X is Cl, each Z is H, and n is 500–5000. Such preferred embodiment is named poly(α,α,α',α'-tetrachloro-p-xylylene), abbreviated PTCPX.

Techniques for preparing these compounds are well known. Suitable methods are taught in the aforementioned U.S. Pat. No. 3,349,045, (1967 Union Carbide (Gilch)), U.S. Pat. No. 3,399,124 (1968 Union Carbide (Gilch)), and V. W. Gash, The Reaction of Trichloromethyl Aromatic Compounds with Triethyl Phosphite, J. Org. Chem., V. 32, p. 2007 (1967 June). These documents are incorporated herein by reference.

A preferred technique for preparing the compounds is illustrated by the reaction of hexachloro-p-xylene (HCPX) with a 1 to 2 molar equivalent of triethyl or tributyl phosphite. When this mixture is heated to about 110° C., a strongly exothermic reaction is initiated which leads to the formation of PTCPX. The exotherm rate may be conveniently controlled by the addition of a nonreactive solvent such as xylene or o-dichlorobenzene.

The color of PTCPX ranges from white to yellow. The yellow results from impurities in the raw materials (HCPX). PTCPX is insoluble in most solvents and can therefore be purified by washing and/or extracting with hot solvents such as acetone or xylene.

The invention also requires an organic substance which is under at least some conditions flammable. Such organic substances may be animal tissue such as leather, animal fibers such as wool, plant fibers such as cotton or wood, and synthetic polymers. Synthetic polymers are the preferred organic substance.

Suitable synthetic polymers include polyolefins such as polyethylene, polyproplylene, polystyrene, and polybutadiene; polyamids such as nylon 66, nylon 6, nylon 4, nylon 9, nylon 11, nylon 12, and nylon 610; styrenics such as polystyrene and ABS; and polyesters such as polyethylenterephthalate and polybutyleneterephthalate. Preferred synthetic polymers are polyamids, polyesters, and polypropylene.

The invention requires that the flame retardant compound be intimately contacted with the organic substance. By "intimately contacted" is meant that the flame retardant compound and the organic substance both be finely divided and uniformly distributed. This is, of course, a matter of degree, and any degree of contact which improves the flame resistance properties of the organic substance is acceptable. Further, the nature of "finely divided" and "uniformly distributed" will vary according to the nature of the organic substance. Obviously, finely divided wood pulp for paper will allow a more uniform distribution than coarse wool fibers for a felt pad.

When the organic substance is a synthetic polymer, the substance and the flame retardant compound are desirably melt blended to achieve intimate contact. Solution blending is not generally possible because of the lack of solubility of the flame retardant compounds.

The flame retardant compound is incorporated into the organic substance in a flame retarding amount. By "flame retarding amount" is meant an amount which will render the organic substance more flame resistant than if the flame retardant compound were totally absent. Although the precise amount of flame retardant compound which is most advantageously added to the organic substance will vary with the particular flame retardant, the particular organic substance, and the degree of intimate contact, generally the flame retardant compound will be present at 5–50, desiraly 10–40, and preferably 15–30 weight percent, based on the combined weight of the organic substance and the flame retardant compound (and any other additives or adjuvants).

This invention is similar to many other flame resistant organic substances containing a flame retardant compound in that the flame resistance is synergistically improved by the addition of adjuvants such as antimony trioxide.

Based on small-scale tests, the flame resistant organic substances of the invention appear to be resistant to solvent leaching and should find particular utility when the organic substance is a synthetic polymer and the substance is subject to conditions which tend to impair the ability of conventional flame retardants to remain in intimate contact with the organic substance. Typical of such conditions are extended service life, exposure to solvents, and exposure to elevated temperatures.

The invention is further defined in the following examples.

EXAMPLE 1

Poly(tetrachloro-p-xylylene) was prepared by a modification of the procedure presented in J. Org Chem V32, p 2007, (1966):

156.5 g of hexachloro-p-xylene, 103.75 g of triethylphosphite, and 150 ml of xylene were charged to a 1 liter 3-necked flask equipped with stirrer, condenser, and nitrogen inlet. A slow stream of nitrogen was passed through the flask and the contents were heated to reflux with stirring (ca 140° C.). When the internal flask temperature reached 120°–130° C. a white precipitate of PTCPX began to form. Heating was maintained for 6 hours. The reaction was cooled to room temperature and the PTCPX precipitate collected by filtration. The precipitate was then slurried with 1 liter of boiling acetone and re-filtered. This slurry procedure was repeated two times. The white product was then dried to afford 103 g of PTCPX (85% yield) containing 58–59% chlorine (theory 58.6%). The filtrates were shown to contain 19.6 g of unreacted hexachloro-p-xylene. The mass balance of the hexachlorop-xylene was therefore 98% (i.e. product plus unreacted reagent account for all but 2% of the starting amount of the reagent).

EXAMPLE 2

Nylon 6 (Zytel 211, DuPont) was dry blended with PTCPX and with antimony trioxide in the ratios shown in Table 1, and then melt blended using a Haake twin-rotor internal bowl mixer operating at 225° C. After mixing for 5 minutes at 225° C. the mixture was compression moulded between chromed steel plates for 4 minutes at 235° C. to afford 1/16" (1.6 mm) thick sheets. Specimens were cut from this sheet and rated for flammability by the UL94 vertical burn test (Underwriters Laboratory). Results are shown in Table I. These data show that, when used with antimony oxide in 3:1 to 5:1 (PTCPX:$Sb_2O_3$) weight ratios, at addition levels of 27 to 30%, the PTCPX compound of the present invention imparts a VO rating (the highest rating possible) to Nylon 6.

EXAMPLE 3

(Comparative)

Following the procedure of Example 2, nylon 6 was formulated with 20% of a commercial chlorinated cycloaliphatic flame retardant (Dechlorane Plus, Occidental Chem Corp—1,2,3,4,7,8,9,10,13,13,14,14-dodecachloro-1,4,4a,5,6,6a,7,10,10a,11,12,12a-dodecahydro-1,4:7,10-dimethanodibenzo(a,e)cyclooctene) and 5% antimony trioxide. A VO rating was achieved. These data are reported in Table I.

TABLE I

| | NYLON 6 UL 94 RATING | | | | | | | | |
|---|---|---|---|---|---|---|---|---|---|
| Sample | 1 | 2 | 3 | 4 | 5 | 6 | 7 | 8 | 9 |
| % Nylon | 68.5 | 64.0 | 68.4 | 64.0 | 68.5 | 64 | 73.5 | 64.0 | 75.0 |
| % PTCPX(1) | 21.0 | 24.0 | 23.7 | 27.0 | 25.2 | 28.8 | 22.0 | 30.0 | — |
| % $Sb_2O_3$ | 10.5 | 12.0 | 7.9 | 9.0 | 6.3 | 7.2 | 4.5 | 6.0 | 5.0 |
| % Dechlorane Plus* | — | — | — | — | — | — | — | — | 20 |
| mmol Cl/100 g polymer | 346 | 396 | 391 | 445 | 416 | 475 | 363 | 495 | 366 |
| UL 94 rating for 1/16" thickness(2) | V2 | V2 | V2 | V0 | V2 | V0 | V2 | V0 | V0 |

*Not an example of the invention; contains 65% chlorine (1)Contains 58.5% chlorine (2)Order of ratings, from best to worst, is V0, V1, V2 and F.

EXAMPLE 4

PTCPX and Dechlorane Plus were compared for volatility/thermal stability by thermogravimetric analysis (TGA) using a 20° C./minute temperature rise rate and a nitrogen flowrate of 20 ml/minute. For both materials 5% weight loss did not occur below 380° C. Thus PTCPX exhibits high thermal stability, particularly for a molecule in which the chlorine atoms are bound to aliphatic carbon (rather than cycloaliphatic carbon) atoms.

EXAMPLE 5

Samples of nylon 6 containing $Sb_2O_3$ and either PTCPX or Dechlorane Plus were compounded as for samples 4 and 9 in Table I. Portions of these samples were placed in the thimble of a Soxhlet apparatus and extracted in either toluene, methyl ethyl ketone, or chloroform for 80 hours. The weight loss of each was as a percentage of the original weight of the sample and is reported in Table II.

TABLE II

| Solvent Extraction Weight Loss | | | |
|---|---|---|---|
| | Solvent | | |
| | Toluene | MEK | $CHCl_3$ |
| PTCPX | 1.4 | 2.7 | 1.7 |
| Dechlorane Plus | 3.0 | 4.3 | 5.0 |

These data show that in nylon 6, formulations containing Dechlorane Plus exhibits more solvent extraction weight loss than those containing PTCPX. This indicates that formulations containing PTCPX will remain more effective in harsh environments than those containing Dechlorane Plus.

EXAMPLE 6

Nylon 6 was compunded as shown in Table III on a Haake twin-screw extruder operating with barrel/die temperatures of 190°-230° C., and the resulting extrudates subjected to injection moulding. Resulting specimens were assessed for tensile strength and Vicat softening point. The results are shown in Table III.

TABLE III

Physical Properties in Nylon 6

| Sample | 10 | 11 | 12 |
|---|---|---|---|
| % Nylon 6 | 100 | 64 | 75 |
| % PTCPX | — | 27 | — |
| % $Sb_2O_3$ | — | 9 | 5 |
| % Dechlorane Plus | — | — | 20 |
| Vicat Softening Point (°C.) | 196 | 193 | 195 |
| Tensile Strength, psi (MPa) | 6099 (42.05) | 5592 (38.55) | 5286 (36.45) |
| % Retention of TS relative to virgin Nylon 6 | — | 91.7 | 86.7 |

These data show that PTCPX exerts little depression upon the Vicat value and allows a significantly higher percentage of the original tensile strength of Nylon 6 to be retained compared to Dechlorane Plus, despite the higher additive level of PTCPX.

EXAMPLE 7

Polybutylene terephthalate (Valox 420, General Electric) containing 30% by weight of the glass fiber was dry blended with PTCPX and antimony oxide at the levels shown in Table IV, and then melt blended in a Haake twin-rotor internal bowl mixer at 225° C. for 5 minutes. Formulations were then compression moulded for 5 minutes at 230° C. into sheets of 1/16" (1.6 mm) thickness. The flammability of specimens cut from such sheets was assessed by the UL94 method, and the results are shown in Table IV

EXAMPLE 8

(Comparative)

The procedure of Example 7 was repeated except that a commercial flame retardant, BC-58 (Great Lakes Chem. Corp.—2,4,6-tribromophenyl terminated tetrabromobisphenol-A carbonate oligomer), was used in place of PTCPX. These data are shown in Table IV (Sample 20).

TABLE IV

| Sample | 13 | 14 | 15 | 16 | 17 | 18 | 19 | 20 |
|---|---|---|---|---|---|---|---|---|
| % PBT | 85.0 | 83.5 | 82.0 | 83.5 | 82.0 | 80.5 | 80.0 | 80.0 |
| % PTCPX | 12.5 | 12.5 | 12.5 | 14.0 | 14.0 | 14.0 | 16.0 | — |
| % $Sb_2O_3$ | 2.5 | 4.0 | 5.5 | 2.5 | 4.0 | 5.5 | 4.0 | 4.0 |
| % BC58* | — | — | — | — | — | — | — | 16.0 |

TABLE IV-continued

| Sample | 13 | 14 | 15 | 16 | 17 | 18 | 19 | 20 |
|---|---|---|---|---|---|---|---|---|
| Wt % halogen/100 g | 7.31 | 7.31 | 7.31 | 8.19 | 8.19 | 8.19 | 9.36 | 9.41 |
| UL94 rating for 1/16 inch | F | V1/V2 | V0 | F | V0 | V0 | V0 | V0 |

*Not an example of the invention

These data show that PTCPX, when used in combination with antimony oxide in PTCPX: $Sb_2O_3$ weight ratios of 2.5 to 3.5:1, affords VO ratings at lower weight % and also lower weight % of halogen loadings, in glass-filled PBT than are afforded by BC58.

EXAMPLE 9

ABS polymer (Cyclolac T1000, Borg-Warner) was compounded for 10 minutes on a two-roll mill at 160°-170° C. with PTCPX and antimony oxide at the levels shown in Table V. After mixing the formulations were compression moulded into 3 mm thick sheets; specimens were cut from each sheet and assessed in the UL94 test. Results are shown in Table V.

EXAMPLE 10

(Comparative)

The procedure of Example 9 was repeated except that polyvinylchloride (also known to the prior art as a flame retardant) was used in place of PTCPX. The results are shown in Table V.

TABLE V

ABS - UL 94 Ratings

| Sample | 21 | 22 | 23 |
|---|---|---|---|
| Wt % ABS | 76.0 | 74.5 | 77.5 |
| Wt % PTCPX | 16.0 | 17.0 | — |
| Wt % $Sb_2O_3$ | 8.0 | 8.5 | 7.5 |
| Wt % PVC* | — | — | 15.0 |
| UL 94 Rating at 3 mm Thickness | V1/F | V0 | F |

*Not an example of the invention

These data show that PTCPX is able to provide a styrenic polymer with a VO rating, and that PTCPX is at least as effective a chlorine source as polyvinylchloride, and does not have the thermal degradation problems associated with PVC.

EXAMPLE 11

Polypropylene polymer (HY6100, Shell) was compounded on a two-roll mill at 170° C. for 10 minutes with 49% by weight of PTCPX, 4% antimony trioxide, and 6% zinc borate. After compression moulding into 3 mm thick sheets specimens afforded a VO rating in the UL94 test.

SUMMARY OF DATA

The data demonstrate that PTCPX is an effective flame retardant additive. They show PTCPX to be effective at reasonably low additive levels, to be resistant to solvent leaching, to not be significantly adverse to tensile strength and softening point of the polymer to which it is added, and to be thermally stable.

I claim:

1. A flame resistant organic substance comprising a synthetic polymer having in intimate contact therewith, by means of melt blending, a flame retarding amount of a flame retardant compound of the formula:

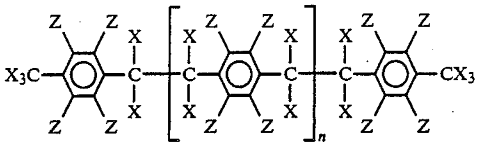

wherein each x is independently Cl, or Br, each Z in independently Cl, Br, or H and n is at least 500.

2. The flame resistant organic substance of claim 1 wherein each X is Cl.

3. The flame resistant organic substance of claim 1 wherein each Z is H.

4. The flame resistant organic substance of claim 2 wherein each Z is H.

5. The flame resistant organic substance of claim 1 wherein n is 500 to 10,000.

6. The flame resistant organic substance of claim 4 wherein n is 500 to 5000.

7. The flame resistant organic substance of claim 1 wherein the polymer is a polyolefin, a polyamide, a styrene containing polymer, or a polyester.

8. The flame resistant organic substance of claim 7 wherein the synthetic polymer is a polyamide.

9. The flame resistant organic substance of claim 7 wherein the synthetic polymer is a polyester.

10. The flame resistant organic substance of claim 1 wherein the flame retardant compound is present at 10–50 weight % based on the combined weight of the synthetic polymer and the flame retardant compound.

11. The flame resistant organic substance of claim 1 wherein a flame retarding amount of antimony trioxide is also in intimate contact with the organic substance.

12. A method of retarding the flammability of a synthetic polymer comprising intimately contacting the polymer with a flame retarding amount of a flame retardant compound of the formula:

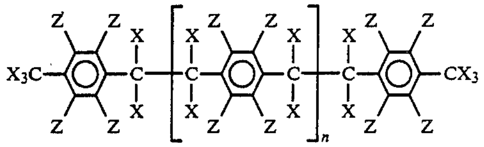

wherein each X is independently Cl, or Br, each Z, is independently Cl, Br or H and n is at least 500, by melt blending the polymer and the flame retardant compound.

13. The flame resistant synthetic polymer produced by the method of claim 12.

* * * * *